United States Patent
Kao et al.

(10) Patent No.: US 11,701,276 B2
(45) Date of Patent: Jul. 18, 2023

(54) DRIVING DEVICE CAPABLE OF WALKING AND STAIR-CLIMBING BY ELECTRIC POWER

(71) Applicant: Daniel Kao, New Taipei (TW)

(72) Inventors: Daniel Kao, New Taipei (TW); Yinxia Jia, New Taipei (TW)

(73) Assignee: Daniel Kao, New Taipei (TW)

( * ) Notice: Subject to any disclaimer, the term of this patent is extended or adjusted under 35 U.S.C. 154(b) by 1184 days.

(21) Appl. No.: 16/281,156

(22) Filed: Feb. 21, 2019

(65) Prior Publication Data
US 2019/0269567 A1   Sep. 5, 2019

(30) Foreign Application Priority Data

Mar. 1, 2018   (CN) .......................... 201810172308.2

(51) Int. Cl.
*A61G 5/06*   (2006.01)
*A61G 5/04*   (2013.01)
(Continued)

(52) U.S. Cl.
CPC ............... *A61G 5/065* (2013.01); *A61G 5/04* (2013.01); *A61G 5/061* (2013.01); *A61G 5/10* (2013.01); *B62B 5/026* (2013.01); *F16H 1/28* (2013.01)

(58) Field of Classification Search
CPC ........ A61G 5/04; A61G 5/10; A61G 2203/42; A61G 5/06; A61G 5/061; A61G 5/065; B62B 5/02; B62B 5/026
See application file for complete search history.

(56) References Cited

U.S. PATENT DOCUMENTS 3,283,839 A * 11/1966 Brown .................. A61G 5/061
                                                                        180/8.2
3,580,344 A *  5/1971 Floyd .................... A61G 5/065
                                                                        180/8.2
(Continued)

FOREIGN PATENT DOCUMENTS

| CN | 102328680 A | 1/2012 |
| CN | 104802846 A | 7/2015 |
| TW | M576451 U | 4/2019 |

OTHER PUBLICATIONS

Taiwanese Office Action in corresponding Taiwanese Application No. 107121080 (Search Report included) dated May 14, 2019, English translation provided, 8 pages total.

*Primary Examiner* — Minnah L Seoh
*Assistant Examiner* — Maurice L Williams
(74) *Attorney, Agent, or Firm* — Bacon & Thomas, PLLC

(57) ABSTRACT

The present invention discloses a driving device capable of walking and stair-climbing by electric power which adopts a combination of a walking mechanism and a climbing carrier to create inventive planetary gear transmission principles. When walking on a flat ground, a driving part drives a sun gear to rotate in a positive direction, two walking wheels are in contact with the ground at the same time, the sun gear drives a planet gear to rotate in a negative direction around a planet shaft, and inner teeth and outer teeth of a gear ring rotate in the negative direction synchronously with the planet gear, thereby a transmission gear drives the walking wheel to rotate in the positive direction to realize rotation of walking. When climbing stairs, the sun gear rotates in the positive direction, the walking wheel is obstructed by stair, the transmission gear, the inner and outer teeth of the gear ring stop rotating, and the sun gear drives the planet gear to revolute along the inner teeth in the positive direction, thereby the planet shaft drives the climb- (Continued)

ing carrier to rotate in the positive direction to realize climbing cross obstacles. Thus, the present invention solves the problem of the known planetary wheel structure that the climbing carrier is driven to rotate in opposite direction when the walking wheel cannot rotate such and thus is difficult to realize the function of stair-climbing, and has advantages of simple structure and safe and reliable use.

6 Claims, 2 Drawing Sheets

(51) Int. Cl.
    *A61G 5/10*      (2006.01)
    *F16H 1/28*      (2006.01)
    *B62B 5/02*      (2006.01)

(56) References Cited

U.S. PATENT DOCUMENTS

| | | | |
|---|---|---|---|
| 4,457,526 A * | 7/1984 | Persson | B62B 5/026 305/1 |
| 4,709,772 A * | 12/1987 | Brunet | A61G 5/065 180/8.2 |
| 4,790,548 A * | 12/1988 | Decelles | A61G 5/061 180/8.2 |
| 5,052,237 A * | 10/1991 | Reimann | B62B 5/026 74/335 |
| 5,701,965 A * | 12/1997 | Kamen | A61G 5/068 700/71 |
| 6,484,829 B1 * | 11/2002 | Cox | B62D 57/028 180/8.1 |
| 6,907,945 B2 * | 6/2005 | Kim | A61G 5/061 180/8.2 |
| 8,430,779 B2 * | 4/2013 | Hoehn | F16H 48/30 475/225 |
| 9,452,097 B2 * | 9/2016 | Lu | A61G 5/065 |
| 9,726,268 B1 * | 8/2017 | Krasowski | A61G 5/065 |
| 10,414,390 B2 * | 9/2019 | Morita | F01M 1/02 |
| 10,557,321 B2 * | 2/2020 | Scekic | E21B 19/20 |
| 2009/0205881 A1 * | 8/2009 | Kim | B62B 5/026 475/11 |
| 2013/0274973 A1 * | 10/2013 | Kamara | B62B 5/0026 180/7.1 |
| 2018/0029505 A1 * | 2/2018 | Ito | B60N 2/0715 |

* cited by examiner

DRIVING DEVICE CAPABLE OF WALKING AND STAIR-CLIMBING BY ELECTRIC POWER

BACKGROUND OF INVENTION

1. Field of Invention

The present invention relates to a technical field of a stair-climbing device, in particular to a driving device capable of walking and stair-climbing by electric power.

2. Related Prior Art

Making a wheelchair climb stairs or transporting a heavy object without an elevator is a difficult thing and needs more manpower to complete, it is therefore proposed an automatic load stair-climbing machine or a stair-climbing wheelchair by using electric power. The stair-climbing machine and the stair-climbing wheelchair basically perform a walking mode in the same manner which can according to a transmission method thereof be divided into three types: crawler type, stepping support type and planetary wheel type.

A stair-climbing device of the crawler type adopts a continuous walking mode, but when a crawler belt leaves the previous stair and proceed to the next stair, this stair-climbing device will tilt forward and backward due to the offset of center of gravity. In view of this, this stair-climbing device is not suitable for use in environments where the step edge of the stair is too smooth and the slope is greater than 30-35 degrees. Moreover, since the crawler belt is heavy in mass and has more abrasion, this stair-climbing device is inconvenient in use, damages the step edge of the stair and has a problem of high maintenance costs in the later period. And, this stair-climbing device encounters greater resistance when it walks on the flat ground, and has a low flexibility when it turns at the corner. In this regard, various improvements have been proposed, but they are still not very satisfactory.

A stair-climbing device of the stepping support type has nearly a hundred years of history which is supported alternatively by two sets of supporting device for achieving a function of up and down stairs. After years of continuous development and improvement, this stair-climbing device has advantages of wide use and higher safety, but this stair-climbing device of the stepping support type is very expensive due to its complex transmission mechanism and highly integrated structure as well as a large number of high hardness lightweight materials used thereof.

A stair-climbing device of the planetary wheel type is made of a few of small wheels evenly distributed on a tie-bar of Y-shape, star shape or cross shape, each of the small wheels can rotate around the respective shaft and can together revolute around a center shaft together with the tie-bar. When walking on a flat ground, each of the small wheels rotates, while when climbing stairs, all of the small wheels together revolute to realize the function of stair-climbing. This stair-climbing device of the planetary wheel type has advantages of simple transmission mechanism, being more flexible during walking, stair-climbing and corner-turning, and light weight and low cost, and is therefore suitable for popularization and application.

A China Patent No. CN103932849B discloses an under-driven self-adaptive type stair-climbing wheelchair, an under-driven train thereof comprises a gearbox, a wheel carrier shaft, a middle shaft, a small shaft, wheels, a gear shifting box, a large gear mounted on the wheel carrier shaft, a middle gear movably mounted on the middle shaft, and a small gear movably mounted on the small shaft. The small gear, the middle gear and the large gear are disposed in the gear box. The number of the wheel and the small gear are the same, and the wheel is fixedly connected with the small gear. The large gear is meshed with the middle gear, and the middle gear is meshed with the small gear. The wheel carrier shaft is connected to the power output end of the gear shifting box. The under-driven train is a planetary gear train with three arms, and this planetary gear train with three arms is advantageous in that it is possible to step cross a higher obstacle.

In this regard, however, when the stair-climbing driving train in the above-mentioned technical solution encounters an obstacle, the wheel will stop rotating, and the small gear and the middle gear will also stop rotating. The torque applied to the middle gear by the large gear will make the entire train flip forward to step cross the obstacle. However, the problem is that the large gear with the middle gear as well as the middle gear with the small gear adopt the outwardly meshed transmission, that is, rotation directions of the large gear and the middle gear are opposite to each other, and rotation directions of the large gear and the small gear are the same. Thus, when the large gear rotates in a positive direction, the middle gear functions as a transmission such that the small gear also rotates in the positive direction. When the large gear rotates in the positive direction to forward in the positive direction, the torque applied to the middle gear by the large gear causes the entire train to rotate in a negative direction that is opposite to the rotation direction of the large gear, that is, the entire train rotates to flip backward rather than rotates to flip forward such that the wheelchair is moved backwardly, and thus, the required stair-climbing function to step cross obstacles forwardly cannot be realized. Furthermore, after searching and analyzing the existing patent technologies, it is found that all of the planetary gear trains with three arms adopt the similar outwardly meshed transmission as previously presented, and thus, it is necessary to study and design a driving device of planetary train wheelchair that can realize the function of stair-climbing and is light and reliable.

SUMMARY OF INVENTION

In order to solve the above-mentioned technical problems, an object of the present invention is to provide a driving device capable of walking and stair-climbing by electric power which adopts transmission working principles of the planetary gear structure and can efficiently achieve the required functions of walking on the flat ground and climbing stairs. And, the present invention solves the problem of the known planetary wheel structure that the climbing carrier is driven to rotate in an opposite direction when the walking wheel cannot rotate and thus is difficult to realize the function of stair-climbing, and has advantages of simple structure, light weight and reliability, and strong practicability.

In order to achieve the above-mentioned purposes, technical solutions of the present invention are as follows:

A driving device capable of walking and stair-climbing by electric power comprises a climbing carrier, a driving part and a walking mechanism, wherein the walking mechanism includes a plurality of walking wheel sets and a planetary wheel set, the walking wheel sets form a planet shape by using an axel center of the planetary wheel set as a center;

the walking wheel set includes a rotating shaft rotatably connected to the climbing carrier, a transmission gear mounted on the rotating shaft and a walking wheel fixed on an outer end of the rotating shaft;

the planetary wheel set includes a main shaft, a sun gear, a planet shaft, a plurality of planet gears and a gear ring, wherein the main shaft is rotatably connected to the climbing carrier and is connected to a power output end of the driving part, the sun gear is fixed on an outer end of the main shaft, the planet shaft is fixedly connected to the climbing carrier, the planet gear is rotatably connected to an outer end of the planet shaft, the gear ring has inner teeth and outer teeth that are concentric with the sun gear;

the planet gear is outwardly meshed with the sun gear and inwardly meshed with the inner teeth of the gear ring, and the outer teeth are outwardly meshed with the transmission gear;

in a flat-ground walking working state, the driving part transmits a power to the main shaft to make the sun gear rotate in a positive direction, two walking wheels are in contact with the ground, the sun gear drives the planet gear to rotate around the planet shaft in a negative direction, the inner teeth and the outer teeth of the gear ring rotate in the negative direction synchronously with the planet gear, thereby the transmission gear drives the walking wheels to rotate in the positive direction to realize rotation of walking;

in a stair-climbing working state, the driving part transmits a power to the main shaft to make the sun gear rotate in a positive direction, the walking wheel are obstructed by the stair, the transmission gear, the inner teeth and the outer teeth of the gear ring stop rotating, the sun gear drives the planet gear to revolute along the inner teeth in the positive direction, thereby the planet shaft drives the climbing carrier to rotate in the positive direction to realize climbing cross obstacles.

Moreover, it further comprises a gear ring fixing plate mounted on the main shaft and located outside of the gear ring, and the gear ring fixing plate is detachably connected to the gear ring.

Moreover, it further comprises a one-way bearing via which the rotating shaft is rotatably connected to the climbing carrier.

Moreover, a number of the walking wheels is from 3 to 5.

Moreover, the driving part includes a rotating motor and a gear shifting mechanism, and the rotating motor is power-connected to the main shaft via the gear shifting mechanism.

Moreover, it further comprises a power control unit electrically connected with the rotating motor, wherein the power control unit includes a battery pack, a battery monitoring module, a display and charge module, a sensing and control module, a control switch and a motor driving module.

Moreover, a sensor in the sensing and control module includes an angular position sensor which is configured to detect walking and climbing angles so as to control an output power of the motor driving module or a rotating speed of the main shaft.

The beneficial effects of the present invention are:

1. In the present invention, the walking mechanism and the climbing carrier are combined with each other to create inventive planet gear transmission working principles, wherein the walking mechanism includes the walking wheel sets and the planetary wheel set which comprises the main shaft, the sun gear, the planet shaft, the planet gear and the gear ring. When it is in the flat-ground walking working state, the driving part transmits the power to the main shaft to make the sun gear rotate in a positive direction, two walking wheels are in contact with the ground, the sun gear drives the planet gear to rotate around the planet shaft in a negative direction, the inner teeth and the outer teeth of the gear ring rotate in the negative direction synchronously with the planet gear, thereby the transmission gear drives the walking wheel to rotate in the positive direction to realize rotation of walking. When it is in the stair-climbing working state, the driving part transmits the power to the main shaft to make the sun gear rotate in the positive direction, the walking wheel is obstructed by the stair, the transmission gear, the inner teeth and the outer teeth of the gear ring stop rotating, the sun gear drives the planet gears to revolute along the inner teeth in the positive direction, thereby the planet shaft drives the climbing carrier to rotate in the positive direction to realize climbing cross obstacles. Thus, the desired functions of walking on the flat ground and climbing stairs can be effectively realized.

2. In the present invention, the gear ring with the inner teeth and the outer teeth is provided, it is not only possible to realize a function of power transmission in the same direction from the sun gear to the transmission gear, but also possible to ensure that the climbing carrier is driven by the planet gear to rotate in the same direction along the inner teeth when the transmission gear and the gear ring are fixed and obstructed. Thus, the present invention solves the problem of the known planetary wheel structure that the climbing carrier is driven to rotate in an opposite direction when the walking wheel cannot rotate and thus is difficult to realize the function of stair-climbing. And, the sun gear has smooth power output, works in a flexible manner without jamming and is light and reliable in use.

3. In the present invention, the rotatable connection to the climbing carrier of the rotating shaft is realized by the one-way bearing, and by using the one-way bearing which is also called the overrunning bearing, when the driving part loses power or a failure of the motor occurs, it is still possible to realize walking along a single direction by manpower, and thus, it is easy to use and can satisfy different practical requirements.

4. In the driving device capable of walking and stair-climbing by electric power of the present invention, the number of the walking wheel sets can be set depending upon the actual application requirements, and the climbing carrier corresponds to the walking wheel sets, and thus, the traditional human transport method is effectively replaced, and it is suitable to use in different stair-climbing applications such as the climbing of the load transport and the climbing of the wheelchair. And, due to its advantages of simple structure, compact layout, light weight, low price and strong practicability, it is therefore suitable for popularization and application.

DETAILED DESCRIPTION OF PREFERRED EMBODIMENT

In order to make the purpose, the technical solutions and the advantages of the present invention become more apparent, the present invention will be further described in detail below with reference to the accompanying drawings.

It should be noted that the technical terminologies or scientific terminologies used herein shall refer to the ordinary meaning as understood by those skilled in the art to which the invention belongs, unless otherwise stated.

Figure 1:
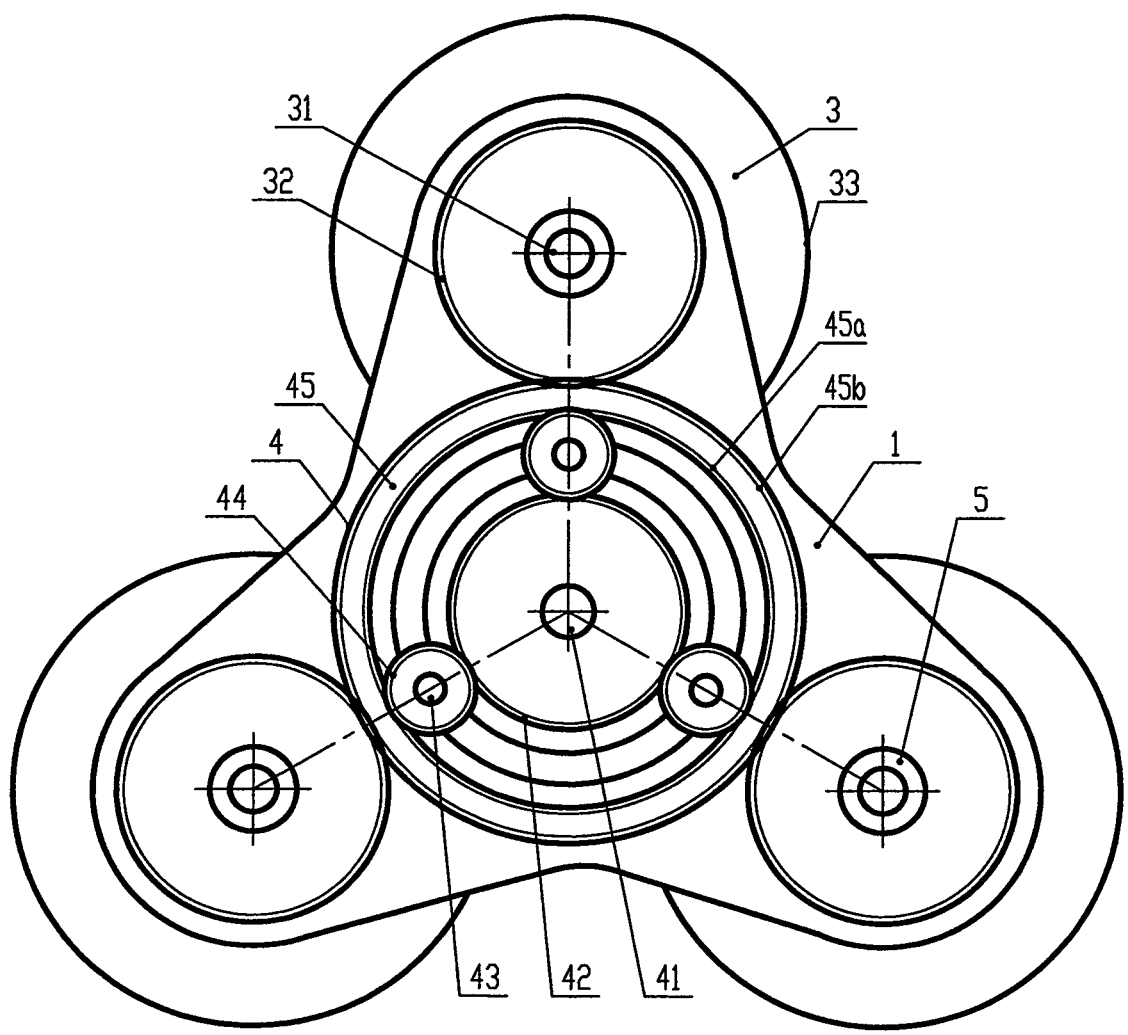
FIG. 1 is a structural schematic view of a driving device capable of walking and stair-climbing by electric power of the present invention.

FIG. 1 illustrates a driving device capable of walking and stair-climbing by electric power which comprises a climbing carrier 1, a driving part and a walking mechanism. The climbing carrier is used as a connection with a wheelchair or a stair-climbing device for load transportation and is mounted on both sides of the bottom of the frame in a longitudinal direction to connect and support structures. The driving part is also mounted on the frame to provide power to the walking mechanism. The climbing carrier and the driving part need to be set according to the walking mechanism correspondingly, and the specific structure can be understood in combination with the known mechanical technical means, and will not be described in detail herein. The walking mechanism includes a plurality of walking wheel sets 3 and a planetary wheel set 4, the walking wheel sets 3 form a planet shape by using an axel center of the planetary wheel set 4 as a center, that is, the plurality of walking wheel sets 3 is uniformly arranged around the axel center of the planetary wheel set 4. The configuration of the climbing carrier 1 can correspond to the number of the walking wheel sets 3. Preferably, the number of the walking wheel sets 3 is from 3 to 5 to satisfy the different loading or using requirements. According to the practical application experience, when three walking wheel sets are provided, it is beneficial to make the walking wheel sets to step cross higher obstacles and suitable for stair climbing.

The walking wheel set 3 comprises a rotating shaft 31 rotatably connected to the climbing carrier 1, a transmission gear 32 mounted on the rotating shaft 31 and a walking wheel 33 fixed on an outer end of the rotating shaft 31. If there are three walking wheel sets 3, lines connecting axel centers of the three rotating shafts 31 form an equilateral triangle, and the adjacent walking wheels 33 must to spaced apart from each other to avoid mutual interference.

The planetary wheel set 4 includes a main shaft 41, a sun gear 42, a planet shaft 43, a planet gear 44 and a gear ring 45. The main shaft 41 is rotatably connected to the climbing carrier 1 and is connected with the power output end of the driving part. The sun gear 42 is fixed on an outer end of the main shaft 41. The planet shaft 43 is fixedly connected to the climbing carrier 1. The planet gear 44 is rotatably connected to an outer end of the planet shaft 43, and the number of the planet gear 44 is multiple, preferably is three, and may correspond to the number of the walking wheel sets 3, or may be specifically set according to actual requirements. Moreover, when the number of the walking wheel and the planet gear are both set as three, the climbing carrier is preferably arranged corresponding to the number of the walking wheel and the planet gear, preferably arranged in a manner that axel centers of the main shaft 41, the planet shaft 43 and the rotating shaft 31 are on the same line. The gear ring 45 has inner teeth 45a and outer teeth 45b concentric with the sun gear 42. The planet gear 44 is outwardly meshed with the sun gear 42 and inwardly meshed with the inner teeth 45a of the gear ring 45, and the outer teeth 45b are outwardly meshed with the transmission gear 32.

The driving part preferably includes a rotating motor and a gear shifting mechanism, and the rotating motor is power-connected to the main shaft via the gear shifting mechanism, which is also called as gear shifting box, for regulating a rotating speed output from the rotating motor. It is possible to adopt the known mature technical means as the gear shifting mechanism.

When in a flat-ground walking working state, the driving part transmits a power to the main shaft to make the sun gear rotate in a positive direction. At the same time, two walking wheels are in contact with the ground, and the climbing carrier is fixed due to the small resistance of the walking wheels. That is, a working mode in which the sun gear is active, the climbing carrier is fixed, and the gear ring is passive is made. And, the sun gear drives the planet gear to rotate around the planet shaft in a negative direction, and the inner teeth and the outer teeth of the gear ring rotate synchronously with the planet gear in the negative direction. That is, since the planet gear is outwardly meshed with the sun gear, the rotation direction of the planet gear is opposite to that of the sun gear, since the inner teeth of the gear ring is inwardly meshed with the planet gear, the rotation direction of the gear ring is the same as that of the planet gear and is opposite to that of the sun gear, and since the outer teeth is outwardly meshed with the transmission gear, the rotation direction of the transmission gear is opposite to that of the gear ring and is the same as that of the sun gear. Thus, the transmission gear drives the walking wheel to rotate in the positive direction to meet the use requirements of positive rotation of walking.

When in a stair-climbing working state, the driving part transmits a power to the main shaft to make the sun gear rotate in a positive direction. At the same time, the walking wheel is obstructed by stair, and the transmission gear together with the gear ring stop rotating. That is, a working mode in which the sun gear is active, the gear ring is fixed and the climbing carrier is passive is made. The planet gear is driven by the sun gear to rotate in a negative direction and to simultaneously revolute along the inner teeth of the gear ring in the positive direction, thereby the planet shaft drives the climbing carrier to rotate in the positive direction to meet the use requirements of driving the walking wheel sets to step cross obstacles.

In view of the above-mentioned technical solutions, providing the gear ring with the inner teeth and the outer teeth not only can realize the same direction power transmission from the sun gear to the transmission gear, but also can ensure that the planet gear drives the climbing carrier to rotate in the same direction along the inner teeth when the transmission gear and the gear ring are fixed and obstructed. Thus, the present invention solves a problem of the known planetary wheel structure that the climbing carrier is driven to rotate in the opposite direction when the walking wheel cannot rotate and thus is difficult realize the function of stair-climbing.

The working principles of the planetary wheel set of the technical solution of the present invention can be summarized as follows:

1) the gear ring is fixed, the sun gear is active and the climbing carrier is passive; 2) the gear ring is fixed, the climbing carrier is active and the sun gear is passive; 3) the sun gear is fixed, the gear ring is active and the climbing carrier is passive; 4) the sun gear is fixed, the climbing carrier is active and the gear ring is passive; 5) the climbing carrier is fixed, the sun gear is active and the gear ring is passive; 6) the climbing carrier is fixed, the gearing ring is active and the sun gear is passive; 7) any two elements of the gear ring, the sun gear and the climbing carrier are combined into one integral; 8) any one element of the gear ring, the sun gear and the climbing carrier is active and the other two elements are free. In view of the above-mentioned principles, using the gear ring as an intermediate transmission element, a plurality of different working mode principles can be realized. And, in a process of cooperating with the transmission gear of the walking wheel, it is possible to ensure that the sun gear has more smooth power output and works in a flexible manner without jamming, and the use thereof is safe and reliable. In view of the above-mentioned working principles of the planetary wheel set, the working principle of the planetary wheel set in the flat-ground walking state is 5) the climbing carrier is fixed, the sun gear is active and the gear ring is passive, while the working principle of the planetary wheel set in the stair-climbing state is 1) the gear ring is fixed, the sun gear is active and the climbing carrier is passive.

Figure 2:
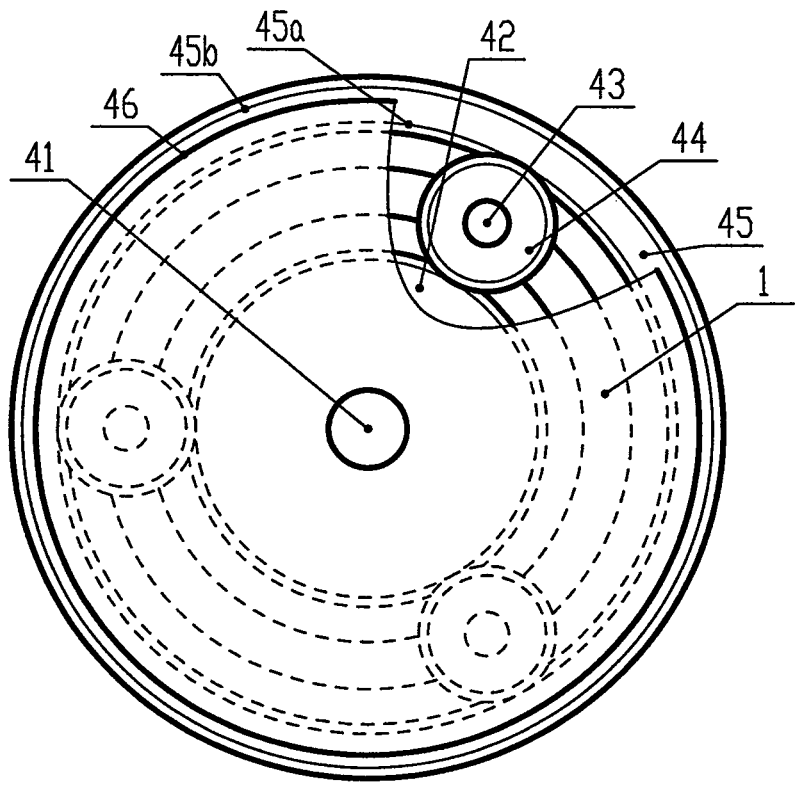
FIG. 2 is a structural schematic view of an example of a planetary wheel set of the present invention.

As shown in FIG. 2, as a preferable technical solution, there is further provided with a gear ring fixing plate 46 mounted on the main shaft and located outside of the gear ring 45, and the gear ring fixing plate 46 is detachably connected to the gear ring 45. The gear ring fixing plate can be used to fix the gear ring and to rotate coaxially with the main shaft to ensure reliable and stable transmission of the gear ring. Another example of the gear ring includes a gear ring internal gear having inner teeth and a gear ring external gear having outer teeth. That is, the inner teeth are provided separately from the outer teeth, the gear ring external gear has a shaft hole for mounting the gear ring internal gear, and the detachable connection between the gear ring external gear and the gear ring internal gear is realized by the gear ring fixing plate. At the same time, it can also be easily manufactured to meet different installation and use requirements.

As a preferable technical solution, there is further provided with a one-way bearing 5 via which the rotating shaft is rotatably connected to the climbing carrier. By using said one-way bearing, which is also called the overrunning bearing, when the driving part loses power or a failure of the motor occurs, it is still possible to realize walking along a single direction by manpower, and thus, it is easy to use and can satisfy different practical requirements.

Figure 3:
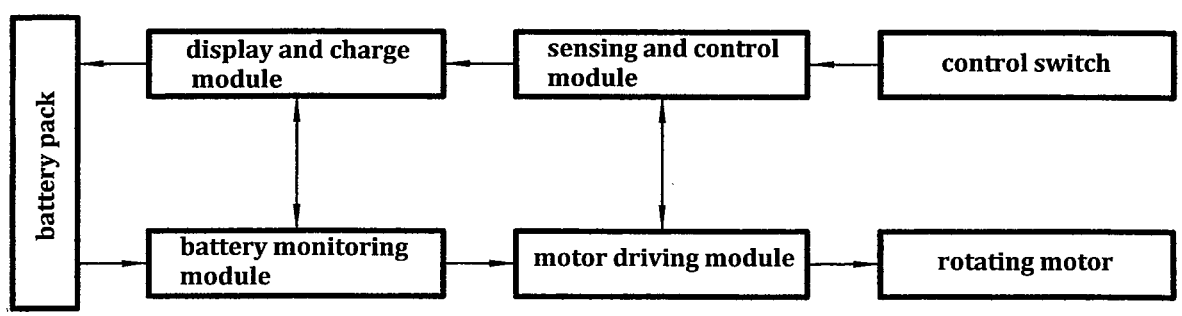
FIG. 3 is a flowchart of a power control unit of the present invention.

As shown in FIG. 3, there is further provided with a power control unit electrically connected to the rotating motor, and the power control unit includes a battery pack, a battery monitoring module, a display and charge module, a sensing and control module, a control switch and a motor driving module. The battery pack provides the motor with power. The battery monitoring module monitors electric quantity and real-time status of use of the battery pack. The display and charge module displays a condition of power and replenishes power. The sensing and control module and the control switch are used for regulating or switching automatic and manual control modes of the driving device, and each control module preferably adopts a PLC integrated control means of the known mature technology.

Furthermore, a sensor in the sensing and control module includes an angular position sensor that is configured to detect walking and climbing angles so as to control the output power of the motor driving module or the rotating speed of the main shaft. In combination with the requirements of installing a wheelchair or a load transport portion provided with the driving device of the present invention, a distance sensor for detecting position or distance and other types of sensors may be provided herein and are not described in detail herein.

In view of the above-mentioned technical solutions, the driving device capable of walking and stair-climbing by electric power can also adopt two or more rotating motors depending upon the loading weight and the actual requirements to provide power, and the installation method of the walking mechanism can be specifically designed for connection and fixing in combination with structures of the known wheelchair and loading stair-climbing machine. Moreover, the driving method is not limited to electric power driving, but it can also be realized by the other power methods according to the actual application environment and the technological progress.

The descriptions and examples as previously presented merely are illustrative and are not intended to limit the scope of the present invention. A person skilled in the art of the present invention can envisage that modifications or replacements of details or forms of the technical solutions of the invention can be made without departing from the spirit and scope of the present invention, and such modifications and replacements are included in the scopes of the present invention.

The invention claimed is:

1. A driving device capable of walking and stair-climbing by electric power, comprising a climbing carrier, a driving part and a walking mechanism, wherein the walking mechanism comprises a plurality of walking wheel sets and a planetary wheel set, the walking wheel sets form a planet shape by using an axel center of the planetary wheel set as a center;

the walking wheel set comprises a rotating shaft rotatably connected to the climbing carrier, a transmission gear mounted on the rotating shaft and a walking wheel fixed on an outer end of the rotating shaft;

the planetary wheel set comprises a main shaft, a sun gear, a planet shaft, a planet gear and a gear ring, the main shaft is rotatably connected to the climbing carrier and connected to a power output end of the driving part, the sun gear is fixed on an outer end of the main shaft, the planet shaft is fixedly connected to the climbing carrier, the planet gear is rotatably connected to an outer end of the planet shaft, and a number of the planet gear is multiple, and the gear ring has inner teeth and outer teeth concentric with the sun gear;

the planet gear is outwardly meshed with the sun gear, the planet gear is inwardly meshed with the inner teeth of the gear ring, and the outer teeth are outwardly meshed with the transmission gear;

in a flat-ground walking working state, the driving part transmits a power to the main shaft to make the sun gear rotate in a positive direction, two walking wheels are in contact with a ground, the sun gear drives the planet gear to rotate around the planet shaft in a negative direction, and the inner teeth and the outer teeth of the gear ring rotate in the negative direction synchronously with the planet gear, thereby the transmission gear drives the walking wheel to rotate in the positive direction to realize rotation of walking; and in a stair-climbing working state, the driving part transmits a power to the main shaft to make the sun gear rotate in a positive direction, the walking wheel is obstructed by a stair, the transmission gear, the inner teeth and the outer teeth of the gear ring stop rotating, and the sun gear drives the planet gear to revolute along the inner teeth in the positive direction, thereby the planet shaft drives the climbing carrier to rotate in the positive direction to realize climbing cross obstacles, wherein the driving device capable of walking and climbing by electric power further comprises a one-way bearing via which the rotating shaft is rotatably connected to the climbing carrier.

2. The driving device capable of walking and climbing by electric power of claim 1 further comprising a gear ring fixing plate mounted on the main shaft and located outside of the gear ring, wherein the gear ring fixing plate is detachably connected to the gear ring.

3. The driving device capable of walking and stair-climbing by electric power of claim 1, wherein a number of the walking wheel sets is from 3 to 5.

4. The driving device capable of walking and stair-climbing by electric power of claim 1, wherein the driving part includes a rotating motor power-connected to the main shaft.

5. The driving device capable of walking and stair-climbing by electric power of claim 4 further comprising a power control unit electrically connected with the rotating motor, wherein the power control unit comprises a battery pack, a battery monitoring module, a display and charge module, a sensing and control module, a control switch and a motor driving module.

6. The driving device capable of walking and stair-climbing by electric power of claim 5, wherein a sensor in the sensing and control module comprises an angular position sensor, the angular position sensor is configured to detect walking and climbing angles so as to control an output power of the motor driving module or a rotating speed of the main shaft.

* * * * *